(12) United States Patent
Ronga et al.

(10) Patent No.: US 10,401,066 B2
(45) Date of Patent: Sep. 3, 2019

(54) APPARATUS FOR INJECTING A FLUID IN A PRESSURIZED AIR CONDITIONING OR REFRIGERATION SYSTEM

(71) Applicant: Errecom S.r.l., Corzano (IT)

(72) Inventors: Luca Ronga, Corzano (IT); Nicola Ronga, Corzano (IT)

(*) Notice: Subject to any disclaimer, the term of this patent is extended or adjusted under 35 U.S.C. 154(b) by 159 days.

(21) Appl. No.: 14/210,489

(22) Filed: Mar. 14, 2014

(65) Prior Publication Data

US 2015/0260438 A1    Sep. 17, 2015

(51) Int. Cl.
*G01M 3/22* (2006.01)
*F25B 45/00* (2006.01)

(52) U.S. Cl.
CPC ............ *F25B 45/00* (2013.01); *G01M 3/226* (2013.01); *F25B 2500/222* (2013.01)

(58) Field of Classification Search
CPC ....... B25B 45/00; B65D 83/756; F25B 45/00; F25B 2500/222; G01M 3/226
USPC .................................... 141/328, 348; 62/292
See application file for complete search history.

(56) References Cited

U.S. PATENT DOCUMENTS

| | | | | |
|---|---|---|---|---|
| 1,342,678 A * | 6/1920 | Houghton | ............... | F16N 21/04 137/614 |
| 1,366,381 A * | 1/1921 | Gullborg | ................. | F16N 21/04 184/105.2 |
| 1,637,325 A * | 7/1927 | Jacque | .................... | F16N 21/04 141/351 |
| 1,787,439 A * | 1/1931 | Fesler | ..................... | F16N 21/04 137/614.04 |
| 2,864,366 A * | 12/1958 | Miskel | ..................... | A61M 5/24 604/190 |
| 3,307,595 A * | 3/1967 | Berning | .................... | F23Q 2/52 141/293 |
| 3,402,747 A * | 9/1968 | Tissot-Dupont | ........ | F17C 13/04 137/614 |
| 3,459,177 A * | 8/1969 | Deuschle | ........... | A61B 5/15003 141/348 |
| 3,476,507 A * | 11/1969 | Leeds | ....................... | A61L 2/20 141/348 |
| 4,046,145 A * | 9/1977 | Choksi | .................. | A61J 1/2096 141/2 |
| 4,338,793 A * | 7/1982 | O'Hern, Jr. | ............. | F25B 45/00 137/231 |

(Continued)

FOREIGN PATENT DOCUMENTS

WO    98-12109 A1    3/1998

*Primary Examiner* — Timothy L Maust
*Assistant Examiner* — James R Hakomaki
(74) *Attorney, Agent, or Firm* — Themis Law

(57) ABSTRACT

An apparatus for injecting an additive in a pressurized air conditioning or refrigeration system having a cartridge having two ends, a first open end which connects to the system being charged and a second open end, and wherein the first open end has a threaded nozzle. A piston is sealably disposed with the second open end of the cartridge. An adapter is provided to sealably and releasably connect the cartridge to a service valve of the pressurized air conditioning or refrigeration system without the interposition of an intermediate hose assembly. The adapter is a fitting having a fitting body with a first end portion connectible to the threaded nozzle of the cartridge and a second end portion connectible the service valve of the pressurized air conditioning or refrigeration system.

8 Claims, 6 Drawing Sheets

(56) References Cited

U.S. PATENT DOCUMENTS

| | | | | |
|---|---|---|---|---|
| 4,406,314 A * | 9/1983 | Gomersall | B67D 1/04 | 141/302 |
| 5,673,722 A * | 10/1997 | Brass | F25B 45/00 | 116/276 |
| 5,826,636 A | 10/1998 | Trigiani | | |
| 5,868,224 A * | 2/1999 | DiCarlo | F16L 19/065 | 141/346 |
| 5,967,204 A * | 10/1999 | Ferris | F25B 45/00 | 141/383 |
| 6,050,310 A | 4/2000 | Trigiani | | |
| 6,056,162 A * | 5/2000 | Leighley | F16N 29/00 | 222/156 |
| 6,164,348 A * | 12/2000 | Rodwell | G01M 3/20 | 141/18 |
| 6,170,541 B1 * | 1/2001 | Sanhaji | B60H 1/00585 | 141/98 |
| 6,186,197 B1 | 2/2001 | Trigiani | | |
| 6,253,810 B1 | 7/2001 | Trigiani | | |
| 6,293,319 B1 | 9/2001 | Trigiani | | |
| 6,439,274 B1 * | 8/2002 | DeBoisblanc | B60H 1/00585 | 141/67 |
| 6,561,237 B1 * | 5/2003 | Brass | F16L 29/02 | 141/1 |
| 6,745,591 B1 * | 6/2004 | Lin | F25B 45/00 | 62/292 |
| 6,807,976 B2 * | 10/2004 | Knowles | F16L 37/30 | 137/1 |
| 6,840,291 B2 * | 1/2005 | Caizza | A61M 5/3234 | 141/18 |
| 6,880,587 B1 * | 4/2005 | Carter | B60H 1/00585 | 141/383 |
| 2004/0050146 A1 * | 3/2004 | Anderson | G01M 3/042 | 73/40 |
| 2005/0081914 A1 * | 4/2005 | Kalley | F16L 29/02 | 137/1 |
| 2009/0099512 A1 * | 4/2009 | DiGregorio | B01L 3/5085 | 604/90 |
| 2010/0139296 A1 * | 6/2010 | Eggen | B60H 1/00585 | 62/77 |
| 2012/0048957 A1 * | 3/2012 | Brown | F25B 45/00 | 239/1 |
| 2014/0338385 A1 * | 11/2014 | Ronga | B65D 83/207 | 62/292 |

\* cited by examiner

APPARATUS FOR INJECTING A FLUID IN A PRESSURIZED AIR CONDITIONING OR REFRIGERATION SYSTEM

FIELD OF THE INVENTION

The present invention relates generally to the field of pressurized fluid systems and more specifically it relates to an apparatus for injecting an amount of an additive in a pressurized air conditioning or refrigeration system, for example for detecting and sealing leaks. The additive can be one or a combination of a fluorescent dye, a lubricant, a leak stop, a performance enhancer, an anti moisture additive, a de-icing additive, an acid neutralising additive, an internal refrigerant leak detector.

DESCRIPTION OF THE PRIOR ART

Apparatus for injecting a predetermined amount of a fluorescent dye and/or lubricant into a pressurized system have already been proposed. These apparatus normally comprise a cartridge containing the dye to be injected in the system and having an outlet nozzle, a sealing piston slidable inserted in the cartridge to force the dye out the outlet nozzle, and a hose assembly having an end to be connected to the outlet nozzle and the other end suitable to be connected to a service valve of the pressurized air conditioning or refrigeration system. In one embodiment, known for example from U.S. Pat. No. 6,164,348, the hose assembly comprises a pipe thread to a Luer coupling thread adapter, having one end mateable with a Luer coupling of the outlet nozzle of cartridge; the other end of the adapter is threaded to a check valve fitting, preventing back flow to the syringe. The check valve fitting is in turn threaded to a hose end fitting connected to one end of a flexible high pressure hose segment. A SCHRADER valve coupling is connected to the other end of the hose segment, adapted to be threadably connected to a SCHRADER valve of the low pressure side of an air conditioning/refrigeration system compressor.

It is evident that such an arrangement requires the provision and the assembly of a number of components and therefore has a complicated structure, also expensive to manufacture and store for the supplier. This is a great drawback also because the market requires that the apparatus is entirely disposable.

In addition, the presence of many components, and in particular of the hose segment, may cause the formation of air in the hose assembly. The user must pay attention to push out the air from the hose assembly to prevent that bubbles of air are dangerously injected into the system with the dye.

Another disadvantage of this arrangement is that, when the piston has forced all the dye out the cartridge, some of the dye remain contained in the hose assembly.

It is the object of the present invention to provide an apparatus for injecting an additive in an air conditioning or refrigeration system which is able to overcome the above cited drawbacks of the prior art devices.

A further object is to provide an apparatus for detecting and/or sealing leaks in a pressurized air conditioning or refrigeration system that is simple and easy to use.

A still further object is to provide an apparatus for detecting and/or sealing leaks in a pressurized air conditioning or refrigeration system that is economical in cost to manufacture.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein;

FIG. 1a is an axial section view of the apparatus of FIG. 1;

DETAILED DESCRIPTION OF THE PREFERRED EMBODIMENTS

Figure 1:
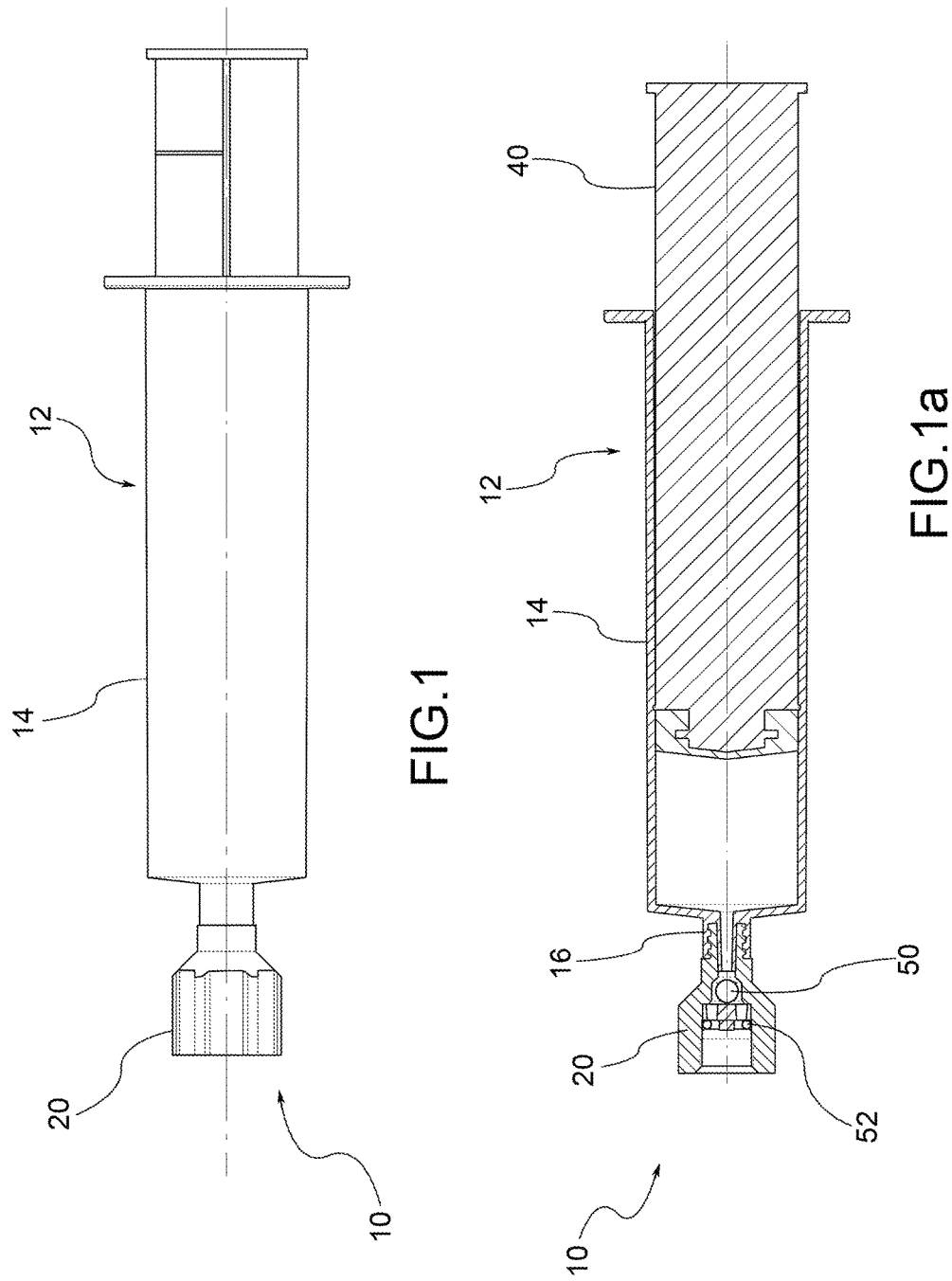
FIG. 1 is a side view of a first embodiment of the apparatus according to the present invention.
Figure 2:
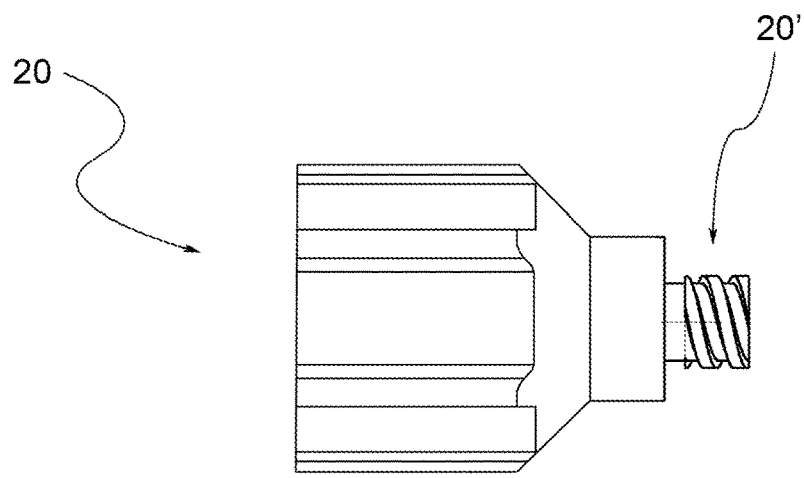
FIG. 2 is a side view of the adapter included in the apparatus of FIG. 1.
Figure 2A:
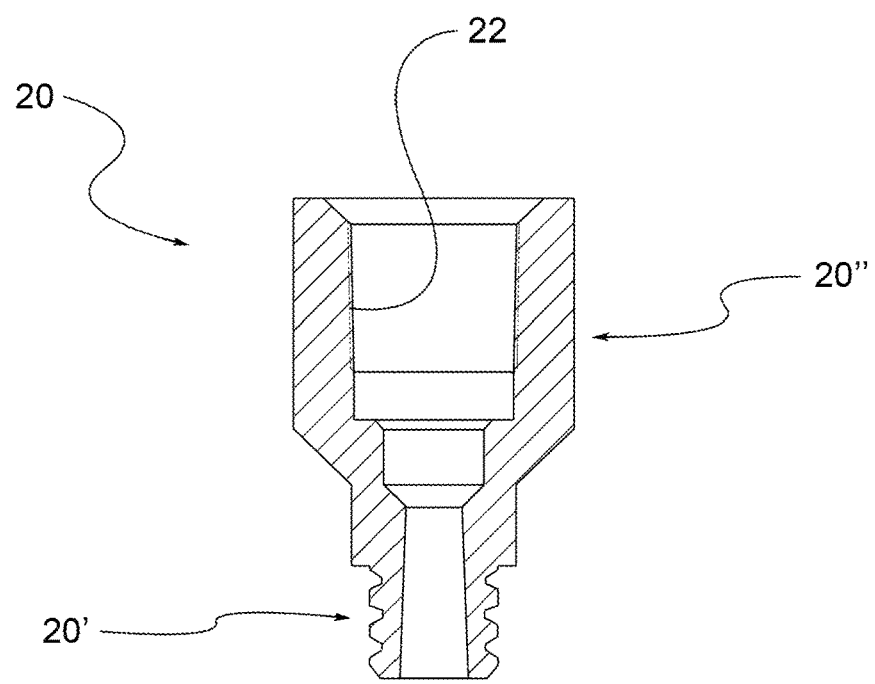
FIG. 2a is an axial section view of the adapter of FIG. 2.

Turning now descriptively to the drawings, in which similar reference characters denote similar elements throughout the several views, FIGS. 1 and 1a illustrate the present invention being an apparatus 10 for injecting an additive, for example a dye for detecting and/or sealing leaks in a pressurized air conditioning or refrigeration system 5; 5'. With regard to the reference numerals used, the following numbering is used throughout the various drawings figures.

The apparatus 10 for injecting an additive in a pressurized air conditioning or refrigeration system comprises a cartridge 12. An adapter 20; 200 is for fluidly coupling the cartridge 12 to a service valve 30; 300 of the pressurized system 5; 5'.

The cartridge 12 includes a tubular casing 14 for holding an additive to be injected in the pressurized air conditioning or refrigeration system. A threaded nozzle 16 is integral with and extends out from a first end of the tubular casing 14, to engage with one end of the adapter 20; 200. A sealing piston 40 is inserted within an open second end of the tubular casing 14 and is slidable within the tubular casing 14 to force the additive out the threaded nozzle 16.

The tubular casing 14 can be fabricated out of transparent material and can include a plurality of gradient markings, to aid in accurately dispensing a suitable amount of the additive therefrom.

In one embodiment, the cartridge 12 further includes a threaded cap—not shown—to engage with the threaded nozzle 16 when the cartridge 12 is not in use, so as to prevent leakage of the additive through the threaded nozzle 16.

In one embodiment, the cartridge 12 is in the form of a disposable syringe, for example of the kind commercially available, at low cost, being constructed of a molded plastic.

In one preferred embodiment, the additive will be pre-packaged by the supplier of the additive in the cartridge. The cartridge 12 preferably has a volume of 30 ml, which will allow for several injections of dye of ¼ ounce each, a sufficient volume to leak test a typical automotive air conditioning system, or, for fewer larger volume injections of dye into a building air conditioning system.

In one preferred embodiment, the threaded nozzle 16 comprises an outlet tube 16' communicating with the interior space of the cartridge. The tube 16' is surrounded with a "Luer" coupling 16" which comprises an internal thread of a form which creates a tight seal with an element advanced thereinto.

The adapter 20; 200 is in the form of a fitting having a fitting body with a first end portion 20'; 200' connected to the threaded nozzle 16 of the cartridge 12 and a second end portion 20"; 200" connected to the service valve 30; 300 of the pressurized system 5, 5'.

In one preferred embodiment, the first end portion and the second end portion are coaxial to each other and to the threaded nozzle 16 of the cartridge 12.

In a preferred embodiment, the first end portion 20'; 200' has an outer thread in such a way to mate with the Luer coupling 16" and to receive the outlet tube 16' of the nozzle 16 of cartridge 12.

In a preferred embodiment, the second end portion 20"; 200" of the fitting body forms a SCHRADER valve coupling to be connected to a SCHRADER valve of the service valve 30; 300 of the pressurized air conditioning or refrigeration system 5; 5'.

Figure 3:
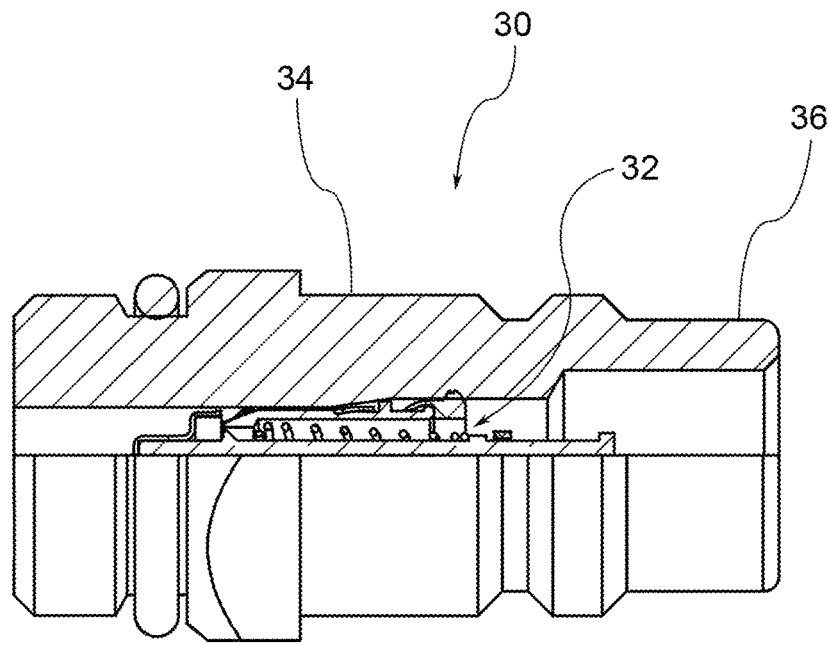
FIG. 3 is a partial axial section view of one embodiment of a service valve of an air conditioning or refrigeration system.
Figure 4:
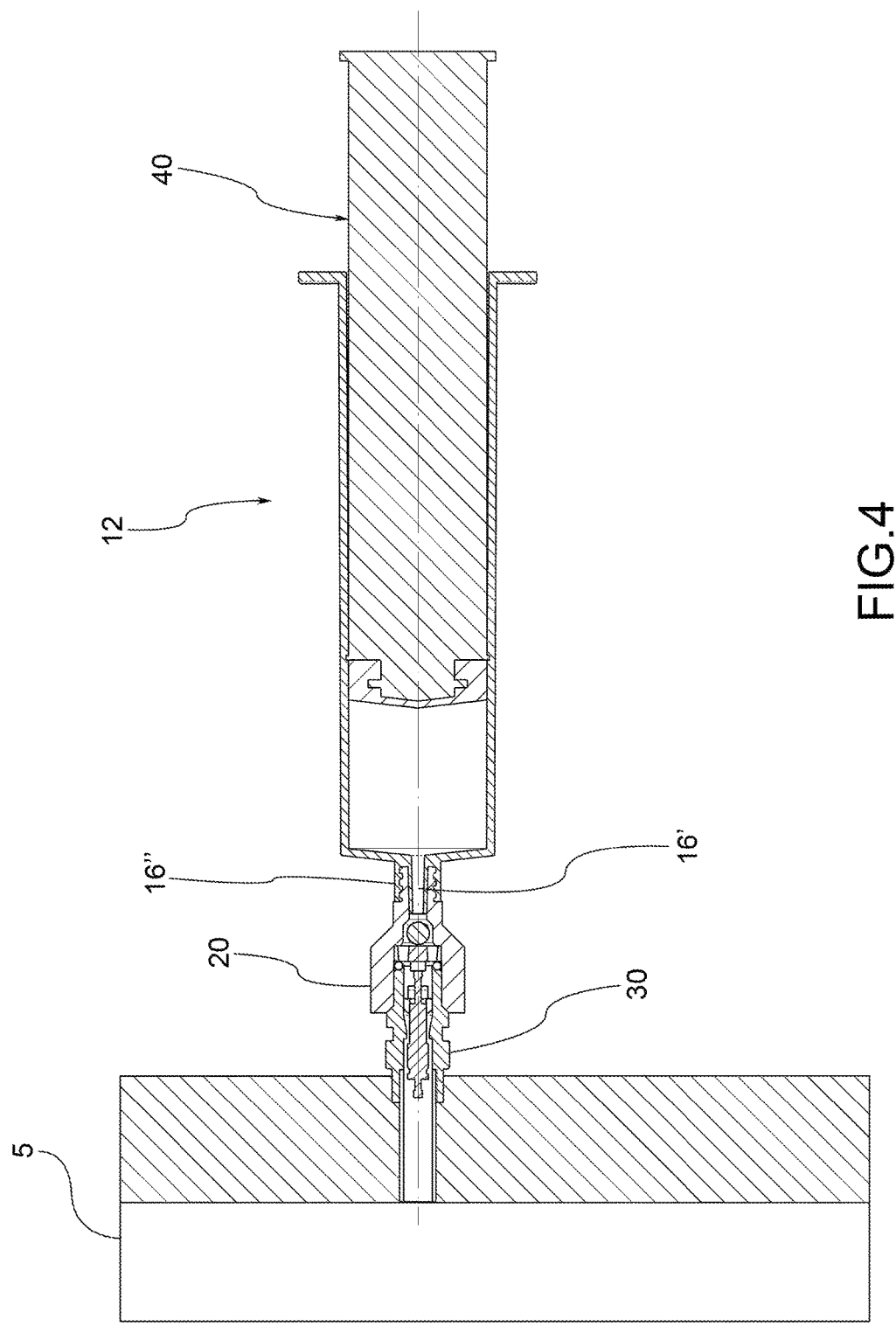
FIG. 4 is an axial section view of the apparatus of FIG. 1 connected to the service valve of FIG. 3.

In one embodiment (FIGS. 3 and 4), the service valve 30 has a SCHRADER valve 32 fitted into an external coupling body 34 having a threaded end portion 36. In this case, the SCHRADER valve coupling of the second end 20" portion of the fitting body has an internal thread 22 to be threadably connected to the threaded end portion 36 of the service valve 30. For example, the SCHRADER valve coupling can have a SAE thread size of ¼ or ⁵⁄₁₆ according to the size of the service SCHRADER valve.

Figure 5:
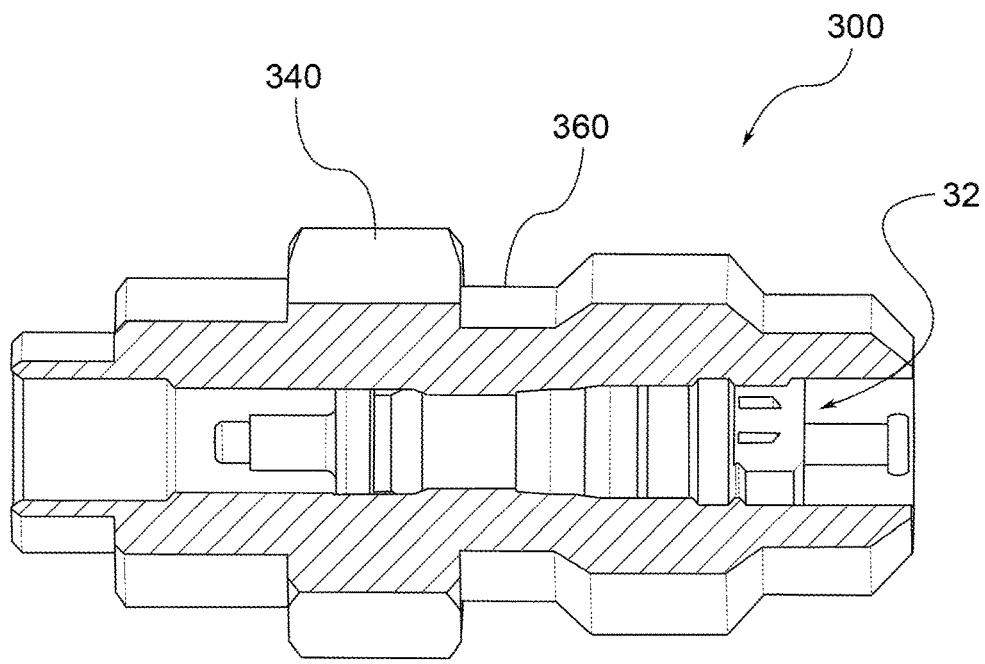
FIG. 5 is a partial axial section view of another embodiment of a service valve of an air conditioning or refrigeration system.
Figure 6:
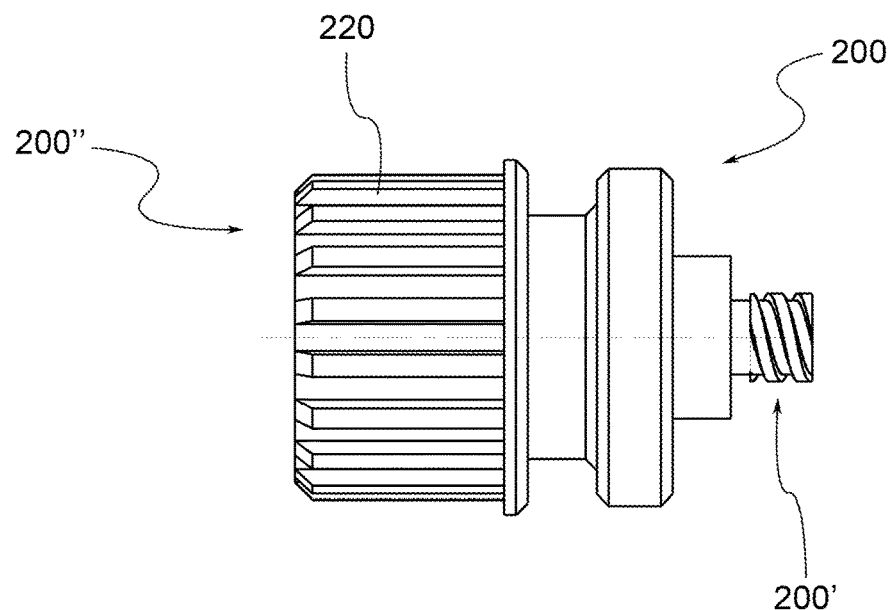
FIG. 6 is a side view of another embodiment of the adapter, suitable for the connection to the service valve of FIG. 5
Figure 6A:
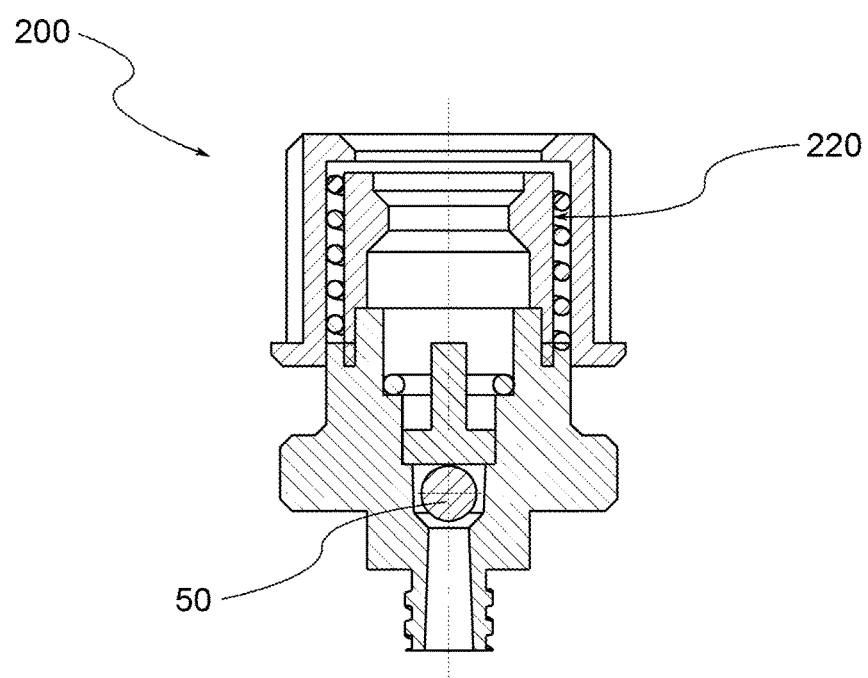
FIG. 6a is an axial section view of the adapter of FIG. 6.
Figure 7:
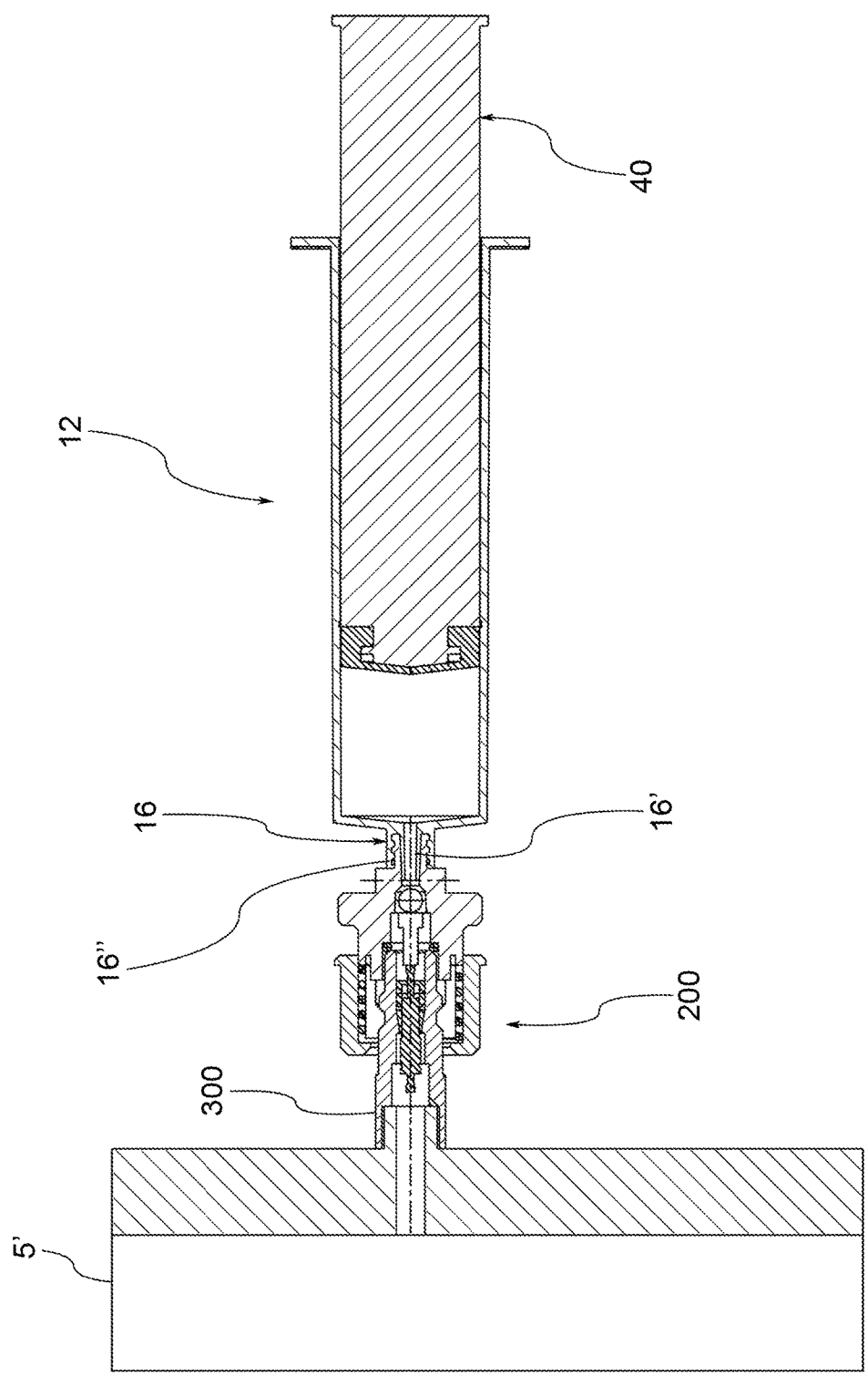
FIG. 7 is an axial section view of the apparatus according to the invention connected to the service valve of FIG. 5.

In one alternative embodiment (FIGS. 5 and 6), the service valve 300 has a SCHRADER valve 32 fitted into an external coupling body 340 having coupling means, for example an annular groove 360, suitable to be engaged by a snap lock fitting 220 made in the second end portion 200" of the fitting body of adapter 200.

In a preferred embodiment, a check valve 50 is housed in the fitting body of the adapter 20; 200, between the first end portion and the second end portion, in order to prevent back flow of the fluid from the air conditioning or refrigeration system to the cartridge. For example, the check valve is a ball check valve.

In a preferred embodiment, the adapter 20; 200 is constructed of a molded plastic, for example Nylon.

In a preferred embodiment, the adapter 20; 200 is fabricated out of transparent material and a sealing ring 52 contained in the second end portion and/or the ball of the check valve 50 can have different colors for identifying the different sizes of the second end portion 20"; 200".

The cartridge according to the invention can be directly connected to the service valve of the pressurized system, without the interposition of a conduit, hose or other intermediate connecting assembly. The adapter consisting only in a fitting, in which the inlet to be coupled to the cartridge is adjacent to the outlet to be coupled to the service valve, prevents the formation of air in the adapter. Therefore, with this arrangement there is no need to push out the air which is normally contained in the hose or conduit or other intermediate assembly.

In addition, the described arrangement ensures that all the pre-established amount of additive to be charged in the air conditioning or refrigeration system is really injected therein, since no additive can remain in any intermediate assembly.

It will be understood that each of the elements described above, or two or more together may also find a useful application in other types of arrangement differing from the type describe above.

While certain novel features of this invention have been shown and described are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

What is claimed is:

1. An apparatus for injecting an additive in a pressurized air conditioning or refrigeration system, comprising:
   a cartridge having two ends, a first open end which connects to the pressurized air conditioning or refrigeration system being charged and a second open end, wherein said first open end comprises a threaded nozzle,
   wherein the cartridge contains a predetermined amount of said additive,
   wherein said additive is one or a combination of a fluorescent dye, a lubricant, a leak stop, a performance enhancer, an anti moisture additive, a de-icing additive, an acid neutralising additive, or an internal refrigerant leak detector,
   wherein said additive is contained in said cartridge at a pressure that is approximately the same as ambient pressure, and
   wherein the threaded nozzle comprises a frusto-conical outlet tube communicating with an interior space of the cartridge and surrounded with a "Luer" coupling which comprises an internal thread;
   a piston sealably disposed with said second open end of said cartridged; and
   a adapter to sealably and releasably connect said cartridge to a service valve of the pressurized air conditioning or refrigeration system without interposition of an intermediate hose assembly,
   wherein said adapter consists in a fitting having a fitting body that is molded as a single piece and has a first end portion with an outer thread to be connected to the internal thread of the Luer coupling and a second end portion to be connected to the service valve of the pressurized air conditioning or refrigeration system, the first end portion further having a frusto-conical inner portion configured to receive the frusto-conical outlet tube of the nozzle of the cartridge,
   wherein the frusto-conical inner portion is directly connected to an outlet of the fitting body to be coupled to the service valve, so as to prevent entrapment of air in the adapter,
   wherein the second end portion of the fitting body forms a SCHRADER valve coupling having an internal thread to be threadably connected to a threaded end portion of the service valve of the pressurized air conditioning or refrigeration system,
wherein a check valve is housed in the fitting body of the adapter, between the first end portion and the second end portion, in order to prevent back flow of fluid from the pressurized air conditioning or refrigeration system to the cartridge.

2. An apparatus according to claim 1, wherein the first end portion and the second end portion are coaxial to each other and to the threaded nozzle of the cartridge.

3. An apparatus according to claim 1, wherein the adapter is constructed of a molded plastic.

4. An apparatus according to claim 1, wherein the second end portion of the fitting body forms a snap lock fitting suitable to engage the service valve.

5. An apparatus according to claim 1, wherein the check valve is a ball check valve.

6. An apparatus according to claim 1, wherein the apparatus is connectible to the service valve of the air conditioning or refrigeration system while the system is pressurized and the piston is displaceable so as to force the additive out of the cartridge against the pressure of the system.

7. A method for injecting an additive in a pressurized air conditioning or refrigeration system, comprising:
sealably and releasably connecting an adapter of an additive-injecting apparatus to a service valve of a pressurized air conditioning or refrigeration system without interposition of an intermediate hose assembly to inject an additive into the air conditioning or refrigeration system while the air conditioning or refrigeration system is pressurized,
wherein the apparatus comprises the adapter, a cartridge having a first open end comprising a threaded nozzle to which the adapter is connected and a second open end, a piston sealably disposed with the second open end of the cartridge, and a predetermined amount of an additive contained within the cartridge,
wherein said additive is one or a combination of a fluorescent dye, a lubricant, a leak stop, a performance enhancer, an anti moisture additive, a de-icing additive, an acid neutralising additive, or an internal refrigerant leak detector,
wherein said additive is contained in said cartridge at a pressure that is essentially the same as ambient pressure,
wherein the threaded nozzle comprises a frusto-conical outlet tube communicating with an interior space of the cartridge and surrounded with a "Luer" coupling which comprises an internal thread, and
wherein the adapter consists in a fitting having a fitting body that is molded as a single piece and has a first end portion having an outer thread to be connected to the internal thread of the Luer coupling and a second end portion which is connected to the service valve of the pressurized air conditioning or refrigeration system, the first end portion further having a frusto-conical inner portion configured to receive the frusto-conical outlet tube of the nozzle of the cartridge,
wherein the frusto-conical inner portion is directly connected to an outlet of the fitting body to be coupled to the service valve, so as to prevent entrapment of air in the adapter,
wherein the second end portion of the fitting body forms a SCHRADER valve coupling having an internal thread which is threadably connected to a threaded end portion of the service valve of the pressurized air conditioning or refrigeration system,
wherein a check valve is housed in the fitting body of the adapter, between the first end portion and the second end portion, in order to prevent back flow of fluid from the pressurized air conditioning or refrigeration system to the cartridge,
wherein the adapter is made from a transparent material, and
wherein the adapter houses a sealing ring disposed next to the check valve, the sealing ring having a color that identified a predetermined size of the second portion.

8. An apparatus for injecting an additive in a pressurized air conditioning or refrigeration system, comprising:
a cartridge having two ends, a first open end which connects to the pressurized air conditioning or refrigeration system being charged and a second open end,
wherein said first open end comprises a threaded nozzle,
wherein the cartridge contains a predetermined amount of said additive,
wherein said additive is one or a combination of a fluorescent dye, a lubricant, a leak stop, a performance enhancer, an anti moisture additive, a de-icing additive, an acid neutralising additive, or an internal refrigerant leak detector,
wherein said additive is contained in said cartridge at a pressure that is approximately the same as ambient pressure, and
wherein the threaded nozzle comprises a frusto-conical outlet tube communicating with an interior space of the cartridge and surrounded with a "Luer" coupling which comprises an internal thread;
a piston sealably disposed with said second open end of said cartridge; and
an adapter to sealably and releasably connect said cartridge to a service valve of the pressurized air conditioning or refrigeration system without interposition of an intermediate hose assembly,
wherein said adapter consists in a fitting having a fitting body that is molded as a single piece and has a first end portion with an outer thread to be connected to the internal thread of the Luer coupling and a second end portion to be connected to the service valve of the pressurized air conditioning or refrigeration system, the first end portion further having a frusto-conical inner portion configured to receive the frusto-conical outlet tube of the nozzle of the cartridge,
wherein the frusto-conical inner portion is directly connected to an outlet of the fitting body to be coupled to the service valve, so as to prevent entrapment of air in the adapter,
wherein the second end portion of the fitting body forms a SCHRADER valve coupling having an internal thread to be threadably connected to a threaded end portion of the service valve of the pressurized air conditioning or refrigeration system,
wherein a check valve is housed in the fitting body of the adapter, between the first end portion and the second end portion, in order to prevent back flow of fluid from the pressurized air conditioning or refrigeration system to the cartridge,
wherein the adapter is made from a transparent material, and
wherein the adapter houses a sealing ring disposed next to the check valve, the sealing ring having a color that identified a predetermined size of the second portion.

* * * * *